United States Patent Office 3,830,708
Patented Aug. 20, 1974

3,830,708
PROCESS FOR THE PURIFICATION OF PHENOL BY AZEOTROPIC DISTILLATION WITH ETHYLENE GLYCOL
Terry L. Karhan, Somerset and Stephen Kaufman, Bridgewater, N.J., assignors to Union Carbide Corporation, New York, N.Y.
No Drawing. Filed July 18, 1972, Ser. No. 272,990
Int. Cl. B01d 3/36; C07c 39/04
U.S. Cl. 203—64      6 Claims

ABSTRACT OF THE DISCLOSURE

The disclosure of this application is directed to a process for the separation of an aromatic hydroxyl compound, particularly a phenol, from a mixture containing an aromatic hydroxyl compound and liquid hydrocarbon impurities as, for example, result from the cleavage of a hydroperoxide produced by the oxidation of an alkyl substituted aromatic hydrocarbon such as cumene or secondary-butylbenzene, by distilling the mixture in the presence of sufficient ethylene glycol to form azeotropic compositions between the ethylene glycol and hydrocarbon impurities with the result that the azeotropic compositions distill off and substantially all of the aromatic hydroxyl compound remains as the distilland.

This invention relates to the purification of an aromatic hydroxyl compound. More particularly, this invention relates to a process for the separation of an aromatic hydroxyl compound, particularly a phenol, from a mixture containing an aromatic hydroxyl compound and liquid hydrocarbon impurities, as for example, result from the cleavage of a hydroperoxide produced by the oxidation of an alkyl substituted, aromatic hydrocarbon such as cumene or secondary-butylbenzene by distilling the mixture in the presence of sufficient ethylene glycol to form azeotropic compositions between the glycol and hydrocarbon impurities with the result that the azeotropic compositions distill off and substantially all of the aromatic hydroxyl compound remains, as the distilland, essentially free of hydrocarbon impurities.

The production of an aromatic hydroxyl compound, such as a phenol, on a commercial scale, can be conveniently carried out by oxidizing an alkyl substituted, aromatic hydrocarbon such as cumene or secondary-butylbenzene to the corresponding hydroperoxide and cleaving the hydroperoxide to form a mixture containing the desired aromatic hydroxyl compound, an aliphatic ketone and hydrocarbon impurities, including unreacted starting material, and recovering the aromatic hydroxyl compound therefrom.

In each case, the precise aliphatic ketone and hydrocarbon impurities in the mixture will depend upon the initial starting material. As an illustration, when cumene is the starting material, the mixture resulting from the oxidation and cleavage reactions will contain acetone, phenol and as hydrocarbon impurities, cumene and α-methylstyrene. When secondary-butyl benzene is the starting material, the mixture resulting from the oxidation and cleavage reactions will contain methyl ethyl ketone, phenol and as hydrocarbon impurities secondary-butylbenzene, α-ethylstyrene and cis and trans phenyl butenes.

Recovery or separation of aromatic hydroxyl compounds, particularly phenol produced by the oxidation of secondary-butylbenzene to the corresponding hydroperoxide and subsequent cleavage of the hydroperoxide, from hydrocarbon impurities using conventional distillation techniques has not been particularly successful. It has been found that phenol co-distills as an azeotrope with the hydrocarbon impurities with attendant loss of recovery efficiency.

Recovery of phenol from the phenol-hydrocarbon impurity fraction, in order to increase recovery efficiency, by a subsequent extractive distillation adds considerably to the overall cost of the operation.

The present invention provides for the separation of aromatic hydroxyl compounds from hydrocarbon impurities by a single distillation step and eliminates costly and time consuming extractive distillation steps as previously described.

According to the present invention, a mixture containing an aromatic hydroxyl compound and liquid hydrocarbon impurities is distilled in the presence of sufficient ethylene glycol to form azeotropic compositions between the ethylene glycol and hydrocarbon impurities with the result that the azeotropic compositions distill off as the distillate.

As another advantageous feature of the present invention, the distillate can be condensed into a settling tank and allowed to separate into two layers, a top layer of the hydrocarbon impurities and a bottom layer of ethylene glycol, which usually contains small amounts of the aromatic hydroxyl compound. The bottom layer can then be recycled back into the main distillation column. Consequently, the present invention eliminates any significant loss of aromatic hydroxyl compound. Whatever small amounts of the aromatic hydroxyl compound are co-distilled over into the distillate portion with the ethylene glycol and hydrocarbon impurities are extracted by the ethylene glycol and the resultant ethylene glycol phase, which can be separated from the hydrocarbon impurity phase in a settling tank, fed back into the distillation column. As a result, losses of aromatic hydroxyl compound are negligible.

As previously stated, this invention is particularly desirable for the separation of an aromatic hydroxyl compound, especially phenol, from hydrocarbon impurities contained in a mixture resulting from the oxidation of an alkyl substituted, aromatic hydrocarbon to the corresponding hydroperoxide and the cleavage of the resultant hydroperoxide.

Suitable alkyl substituted, aromatic hydrocarbons, which can be oxidized to the corresponding hydroperoxides, can be represented by the following formula:

Formula I

wherein Ar is an aryl radical generally having a maximum of fifteen carbon atoms and preferably having a maximum of ten carbon atoms and R and $R^1$, which can be the same or different, are alkyl radicals, each generally having a maximum of ten carbon atoms, and preferably a maximum of five carbon atoms.

Specific compounds falling within the scope of Formula I are: cumene (isopropylbenzene), p-di-isopropylbenzene, m - di - isopropylbenzene, p - isopropyltoluene, secondary-butylbenzene, isopropylnaphthalene and the like.

The oxidation of alkyl substituted, aromatic compounds to the corresponding hydroperoxides can be carried out by methods well known in the art, as for example, are disclosed in U.S. Pat. 2,577,768 to G. G. Joris, issued Dec. 11, 1951.

Oxidation of compounds falling within the scope of Formula I results in hydroperoxides having the formula:

Formula II

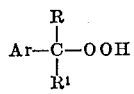

wherein Ar, R and R¹ are as previously defined.

Cleavage of the hydroperoxides produced by the oxidation of an alkyl substituted, aromatic hydrocarbon can be carried out by methods well known in the art, as for example, are disclosed in U.S. Pat. 2,626,281, to G. G. Joris, issued Jan. 20, 1953.

Determinations of the exact nature and amount of hydrocarbon impurities, as noted in this application, were by gas chromatographic analysis.

It is preferred, for purposes of this invention, to remove ketone, which might be present in the mixture to be distilled prior to the distillation step of the present invention. This can be effected by a distillation step in which the ketone is recovered as the distillate.

When operating at atmospheric pressure, the amount of ethylene glycol present, that is between the feed point of the mixture to the distillation column and the top of the distillation column, during the distillation of a mixture resulting from the cleavage of a hydroperoxide produced by the oxidation of secondary-butylbenzene is at least about 15 percent by weight, based on the weight of the hydrocarbon impurities in the feed; with respect to a mixture resulting from the cleavage of a hydroperoxide produced by the oxidation of cumene, the amount of ethylene glycol is also at least about 15 percent by weight based on the weight of the hydrocarbon impurities in the feed.

The distillation of the present invention, which can be conducted under atmospheric, sub-atmospheric or super-atmospheric pressures, is carried out by feeding a mixture containing an aromatic hydroxyl compound and one or more hydrocarbon impurities to a distillation column and distilling the mixture in the presence of sufficient ethylene glycol to form azeotropic compositions between the ethylene glycol and the hydrocarbon impurities. Ethylene glycol in amounts defined in the preceding sentence can be introduced into the distillation column at any convenient location therein: between the feed point of the mixture and the head of the distillation column, or to the top of the distillation column, or to a point below the feed point of the mixture into the distillation column, or at the feed point of the mixture.

The exact temperatures at which the distillation is carried out will depend upon the boiling points of the azeotropes formed. These boiling points are readily determined from standard tables such as appear in Handbook of Chemistry and Physics, 50th Edition.

Data relative to the azeotropes was also published by the American Chemical Society in 1952 in a publication entitled *Azeotropic Data* No. 6 of the Advances in Chemistry Series and in the supplement thereto published in 1962.

The amount of ethylene glycol present during the distillation operation will depend upon the amount necessary to form azeotropes with the hydrocarbon impurities. Once the hydrocarbon impurities are identified, the amount of ethylene glycol necessary to form azeotropes can be readily determined from sources indicated above.

The azeotropic compositions which are distilled off are condensed into a settling tank wherein the ethylene glycol extracts whatever small amounts of aromatic hydroxyl compound may have co-distilled over and settles out as the bottom layer. The ethylene glycol layer is then recycled back into the main distillation column.

The main body of the aromatic hydroxyl compound remains as the distilland in the main distillation column, essentially free of hydrocarbon impurities and is removed from the bottom of the distillation column. This "bottoms stream" can be subjected to a standard distillation step in order to separate and recover the aromatic hydroxyl compound (from any ethylene glycol remaining in the distilland).

The aromatic hydroxyl compounds can be reacted with formaldehyde to produce "phenolic resins or in the case of phenol can be used in the preparation of bisphenols such as 2,2-*bis*(*p*-hydroxyphenyl)propane which is used to prepare polymers such as polycarbonates, polysulfones and polyhydroxyethers by methods well known in the art.

The following examples further illustrate the present invention without limiting the scope thereof.

EXAMPLE 1

A 300 gram mixture, the composition of which is noted below, was subjected to a distillation operation which was conducted batch-wise using a 20 tray Oldershaw column operating under the following conditions:

Pressure—atmospheric
Total reflux
Temperature at head—160° C

|  | Percent by weight |
|---|---|
| Phenol | 19 |
| Secondary-butylbenzene | 58 |
| Ethylene glycol | 20 |
| Acetophenone | 3 |

A 26.4 gram sample, taken from the top of the distillation column after total reflux for about 20 hours, was allowed to separate into two layers in a glass flask and the top layer removed from the bottom layer by decantation. The layers were analyzed by gas chromatography and found to have the following composition:

| | Percent by weight | |
|---|---|---|
| | Top layer (22.0 grams) | Bottom layer (4.4 grams) |
| Phenol | 0.1 | 2.2 |
| Secondary-butylbenzene | 99.8 | 0.6 |
| Ethylene glycol | 0.1 | 97.2 |
| Acetophenone | 0 | 0 |

The composition of the composite sample, as determined by gas chromatographic analysis, was as follows:

|  | Percent by weight |
|---|---|
| Phenol | 0.44 |
| Secondary-butylbenzene | 83.6 |
| Ethylene glycol | 15.86 |
| Acetophenone | 0 |

EXAMPLE 2

A 240 gram mixture, the composition of which is noted below, was subjected to a distillation operation under the conditions described in Example 1.

|  | Percent by weight |
|---|---|
| Phenol | 58.2 |
| Secondary-butylbenzene | 11.3 |
| Ethylene glycol | 16.7 |
| Acetophenone | 9.1 |
| α-Ethylstyrene | } 4.6 |
| 2-Phenyl-2-butenes | |

A 10.3 gram sample, taken from the top of the distillation column after total reflux for about 7 hours, was allowed to separate into two layers in a glass flask and the top layer removed from the bottom layer by decantation. The layers were analyzed by gas chromatography and found to have the following composition:

| | Percent by weight | |
|---|---|---|
| | Top layer (8.7 grams) | Bottom layer (1.6 grams) |
| Phenol | 0.24 | 16.0 |
| Secondary-butylbenzene | 97.66 | 6.1 |
| Ethylene glycol | 0.006 | 77.7 |
| Acetophenone | 0 | 0 |
| α-Ethylstyrene } | 2.094 | 0.2 |
| 2-phenyl-2-butenes } | | |

The composition of the composite sample, as determined by gas chromatographic analysis, was as follows:

| | Percent by weight |
|---|---|
| Phenol | 2.7 |
| Secondary-butylbenzene | 83.2 |
| Ethylene glycol | 12.2 |
| Acetophenone | 0 |
| α-Ethylstyrene | } 1.8 |
| 2-Phenyl-2-butenes | |

For purposes of comparison, an experiment, Control 1, was carried out under the conditions described in Example 1 using a 300 gram mixture having the composition noted below. Control 1 was conducted without using ethylene glycol.

| | Percent by weight |
|---|---|
| Phenol | 69.9 |
| Secondary-butylbenzene | 13.56 |
| Acetophenone | 11.08 |
| α-Ethylstyrene | } 5.5 |
| 2-Phenyl-2-butenes | |
| 2-Butanone | 0.06 |

A 5 gram sample, taken from the top of the distillation column after total reflux for about 12 hours was analyzed by gas chromatography and found to have the following composition:

| | Percent by weight |
|---|---|
| Phenol | 25.3 |
| Secondary-butylbenzene | 52.8 |
| Acetophenone | 0 |
| α-Ethylstyrene | } 2.1 |
| 2-Phenyl-2-butenes | |
| 2-Butanone | 18.3 |
| Unknowns | 1.5 |

What is claimed is:

1. A process for the separation of phenol from a first mixture containing phenol and hydrocarbon impurity, which process comprises the steps of:
adding ethylene glycol to said first mixture to form a secondary mixture containing phenol, ethylene glycol, and hydrocarbon impurity, said ethylene glycol being employed in an amount sufficient to form an azeotropic composition of ethylene glycol and said hydrocarbon impurity; and
distilling said second mixture with the result that said azeotropic composition distills off and the phenol is recovered as the bottoms product,
wherein said hydrocarbon impurity includes at least one of cumene, alpha-methylstyrene, secondary-butylbenzene, alpha-ethylstyrene, cis - phenylbutene, and trans-phenylbutene.

2. A process as defined in claim 1 wherein the said mixture contains phenol and as a hydrocarbon impurity sec-butylbenzene.

3. A process as defined in claim 1 wherein the said mixture contains phenol and as a hydrocarbon impurity α-ethylstyrene.

4. A process as defined in claim 1 wherein the said mixture contains phenol and as a hydrocarbon impurity phenylbutene.

5. A process as defined in claim 1 wherein the said mixture contains phenol and as hydrocarbon impurities, sec-butylbenzene, α-ethylstyrene and phenylbutenes; and is distilled in the presence of at least about 15 percent by weight ethylene glycol, based on the weight of the hydrocarbon impurities.

6. A process for the separation of phenol from a first mixture containing phenol and hydrocarbon impurity, which process comprises the steps of:
adding ethylene glycol to said first mixture to form a second mixture containing phenol, ethylene glycol, and hydrocarbon impurity, said ethylene glycol being employed in an amount sufficient to form an azeotropic composition of ethylene glycol and said hydrocarbon impurity;
distilling said second mixture in a distillation column with the result that said azeotropic composition distills off as the distillate and the phenol is recovered as the bottom product;
feeding said distillate into a settling tank and allowing said distillate to separate into two layers, a top layer containing hydrocarbon impurity and a bottom layer containing ethylene glycol; and
recycling said bottom layer into said distillation column, wherein said hydrocarbon impurity includes at least one of cumene, alpha-methylstyrene, secondary-butylbenzene, alpha-ethylstyrene, cis - phenylbutene, and trans-phenylbutene.

References Cited

UNITED STATES PATENTS

| | | | |
|---|---|---|---|
| 2,265,939 | 12/1941 | Field | 203—64 |
| 3,071,632 | 1/1963 | Schmid | 203—64 |
| 2,339,576 | 1/1944 | Luten, Jr. | 203—64 |
| 2,790,834 | 4/1957 | Morten et al. | 260—621 A |
| 2,824,049 | 2/1958 | Maincon et al. | 260—621 A |

WILBUR L. BASCOMB, JR., Primary Examiner

U.S. Cl. X.R.

260—621 A

UNITED STATES PATENT OFFICE
CERTIFICATE OF CORRECTION

Patent No. 3,830,708　　　　　Dated August 20, 1974

Inventor(s) Terry L. Karhan and Stephen Kaufman

It is certified that error appears in the above-identified patent and that said Letters Patent are hereby corrected as shown below:

Column 5, line 42, "secondary" should read --- second ---. Column 6, line 30, "bottom" should read --- bottoms ---.

Signed and sealed this 29th day of October 1974.

(SEAL)
Attest:

McCOY M. GIBSON JR.　　　　　C. MARSHALL DANN
Attesting Officer　　　　　　Commissioner of Patents